United States Patent [19]

Moran

[11] Patent Number: 5,066,937
[45] Date of Patent: Nov. 19, 1991

[54] SEARCH COIL ASSEMBLY WITH LAMINATE FRAME MEMBERS AND METHOD FOR MAKING SAME

[75] Inventor: James M. Moran, Leominster, Mass.

[73] Assignee: Barkley & Dexter Laboratories, Fitchburg, Mass.

[21] Appl. No.: 557,626

[22] Filed: Jun. 24, 1990

[51] Int. Cl.⁵ .................. H01F 15/04; H01F 27/28
[52] U.S. Cl. .................. 336/84 C; 29/605; 174/35 MS; 324/239; 336/96
[58] Field of Search .............. 336/84 R, 84 C, 96, 336/198, 208; 174/35 R, 35 MS; 361/424; 324/228, 238, 239, 240, 241, 242, 243; 29/605, 602.1

[56] References Cited

U.S. PATENT DOCUMENTS

| | | | |
|---|---|---|---|
| 1,370,093 | 3/1921 | Crouse et al. | 336/84 C |
| 1,962,584 | 6/1934 | Davies | 174/35 MS |
| 2,321,587 | 6/1943 | Davie et al. | 174/35 MS |
| 2,599,944 | 6/1952 | Salisbury | 174/35 MS |
| 3,295,002 | 12/1966 | Amans | 174/35 MS |
| 3,334,175 | 8/1967 | Vincent | 174/35 MS |
| 3,376,531 | 4/1968 | Fischer et al. | 336/84 C |
| 3,464,041 | 8/1969 | Waterman | 336/5 |
| 3,577,109 | 5/1971 | Foster | 336/84 |
| 3,842,186 | 10/1974 | Hall | 336/84 C |
| 4,255,849 | 3/1981 | Beck | 29/599 |
| 4,451,812 | 5/1984 | Vescovi et al. | 336/84 C |
| 4,814,734 | 3/1989 | Moran | 336/84 |

*Primary Examiner*—Thomas J. Kozma
*Attorney, Agent, or Firm*—Lorusso & Loud

[57] ABSTRACT

A metal detector search coil assembly comprising a frame assembly having an aperture therethrough, electrically conductive strands wound upon the frame assembly, potting plastic disposed on external surfaces of the frame assembly embedding the strands, and a metal housing enclosing the potting plastic, the frame comprising a plurality of frame members joined together to form the aperture, each of the frame members comprising first and second sheets of rigid plastic bonded together with an electrically conductive material disposed therebetween, and adhesive being disposed on the sheets to bond the sheets together; and a method for making such a metal detector search coil assembly.

1 Claim, 2 Drawing Sheets

SEARCH COIL ASSEMBLY WITH LAMINATE FRAME MEMBERS AND METHOD FOR MAKING SAME

BACKGROUND OF THE INVENTION

1. Field of the Invention

This invention relates to metal detectors of the type used to detect metal fragments in foodstruffs and pharmaceuticals, and is directed more particularly to an improved search coil frame member, frame assembly and search coil assembly, and method for making same.

2. Description of the Prior Art

In many industries, non-metallic materials, such as foodstuffs and pharmaceuticals, are conveyed automatically to various processing machines and stations. A problem arises when tramp metal is introduced into the material stream. Such tramp metal can constitute a hazard if sold to the public in foodstuffs or pharmaceuticals, and even in the processing area can constitute a hazard for some types of processing machinery.

It is known in the art that non-metallic material can be passed through an electromagnetic field of a search coil and that if tramp metal is present in the material stream such metal will disturb the electromagnetic field of the search coil and induce a detectable error signal. Responsive to the error signal, the material stream can be stopped or diverted to a waste container, accompanied, if desired, by visual and audible alarm means.

It is known in the art to employ a conductive shield between the electrical conductors which generate the electrical field and the product under inspection for metal contamination. The shield may comprise a conductive coating, such as a dispersion of carbon emulsion, or a graphite. The shield acts to improve the discriminating abilities of the metal detection system when the products under inspection are themselves conductive to high frequency currents. Further, the shield operates to reduce spurious signal effects created by product transport mechanisms, such as belts and chutes.

In a method used in the manufacture of metal detector search coil assemblies, a correct size frame is made having an aperture of desired shape and size. The internal walls of the aperture are coated with a graphite or carbon emulsion to provide the above-described electrostatic shield and over the graphite or carbon there is applied a coating of plastic, as by spraying, dipping or cementing sheets of hard plastic to form a protective layer for the aperture. On the external walls, conductive strands are wound on the frame which is then attached to a rigid metal housing which provides an enclosed void around the exterior of the frame and strands. The space between the strands and the housing is then filled with non-metallic filler, such as an epoxy or other potting plastic. The filler acts as a moisture sealant, as well as a retainer for reducing the relative motion between the metal housing and the strands. Any relative motion between the strands and the surrounding metal housing results in a spurious signal.

The carbon or graphite coating is provided with a gap extending in the direction of travel of the product through the aperture. The conductive coating is electrically connected to a reference ground system in a manner normally used to provide a discharge path for static electricity.

The above-described apparatus is vulnerable to deterioration because of moisture penetration of the aperture plastic coating, aggravated by temperature cycling.

In U.S. Pat. No. 4,814,734, issued Mar. 21, 1989 in the name of James M. Moran, and U.S. Pat. No. 4,819,321, issued Apr. 11, 1989 in the name of James M. Moran, there is disclosed a metal detector search coil assembly, and an alternative method for making same. The assembly there disclosed includes, among other things, the provision of a non-conductive coil frame, the application of a layer of conductive carbon material to the external surfaces of the search coil assembly frame, and a layer of insulating plastic material applied over the carbon material. Vinyl insulating strips are placed on the plastic layer in positions where the coil is to be located so as to increase insulation between the conductive shield coating and the coil windings. A disadvantage of this construction is that the conductive coating is positioned quite close to the coil wires.

An object of the present invention is to provide an improved structure and method which facilitates positioning of the shield between the coil conductor wires and the product under inspection, and in which no additional insulation materials are required.

A further object of the invention is to provide a search coil structure and method providing an aperture in which the exposed surfaces are stable and rigid and able to withstand the use and environmental changes to which the aperture surface is subjected.

With the above and other objects in view, as will hereinafter appear, a feature of the present invention is the provision of a metal detector search coil assembly comprising a frame assembly having an aperture therethrough, electrically conductive strands wound upon the frame assembly, potting plastic disposed on external surfaces of the frame assembly and embedding the strands, and a metal housing enclosing the plotting plastic, the frame comprising a plurality of frame members joined together to form the aperture, each of the frame members comprising a first sheet of rigid plastic, a second sheet of rigid plastic of substantially the same configuration and substantially the same size as the first sheet, an electrically conductive material disposed between the first and second rigid plastic sheets, and adhesive disposed on the sheets to bond the sheets together with the conductive material bonded therebetween.

A further feature of the present invention is a method of making the above-described metal detector search coil assembly.

The above and other features of the invention, including various novel details of construction and combinations of parts, will now be more particularly described with reference to the accompanying drawings and pointed out in the claims. It will be understood that the particular device and method embodying the invention are shown by the way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENTS

Figure 1:
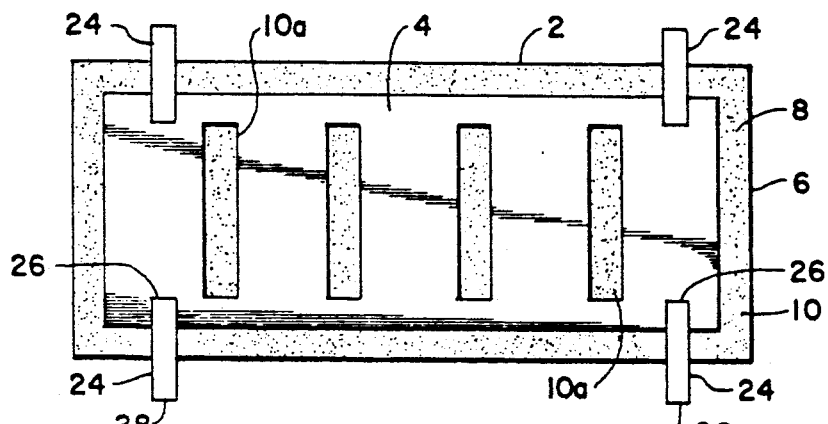
FIG. 1 is a plan view of a sheet of rigid plastic as used in the formation of a laminate frame member provided in accordance with the invention.

Referring to FIG. 1, it will be seen that there is provided a first sheet 2 of rigid plastic. Applied to the first sheet 2 is an electrically conductive material 4, such as graphite, preferably spaced inwardly from the peripheral edges 6 of the sheet. To margins 8, between the peripheral edges 6 and the conductive material 4, there is applied an adhesive 10. Additional pockets of adhesive 10a may be applied in selected locations to aid in bonding, the adhesive pockets 10a being surrounded by the conductive material. It has been found that the conductive material performs its shielding function even when not covering the whole of the surface; accordingly, application of additional pockets of adhesive serve to increase bonding while not deleteriously affecting the shielding properties of the conductive material.

It appears to be beneficial to keep the conductive material 4 spaced from the peripheral edges 6 of the sheets 2 to remove a possible undesirable electrical path such as might arise if the edge of a sheet touches any conductive object, such as the inner surface of a metal housing which comprises the outside shell of the complete search coil assembly.

Figure 2:
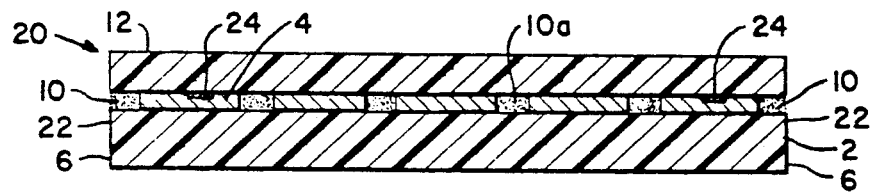
FIG. 2 is a center line sectional view taken through a laminate frame member.

Referring to FIG. 2, it will be seen that the first sheet of rigid plastic 2 is pressed to a second sheet of rigid plastic 12 with the conductive material 4 disposed therebetween, to form a laminate frame member 20. The first and second sheets of rigid plastic material are substantially the same configuration and the same size, so that their combination, as shown in FIG. 2, provides a member 20 having smooth uniform edges 22. While the conductive material 4 and adhesive 10, 10a are shown in FIG. 1 as being disposed on the first sheet 2, it will be apparent that in the manufacturing process, if desired, the conductive material 4 may be placed on one sheet while the adhesive is placed on the other, or, the adhesive and/or conductive material may be placed on both sheets.

To form a search coil assembly 30 (FIG. 3), a number of the laminate frame members 20 are joined together, as by gluing, to define an aperture 32 therethrough, the aperture being of a selected size and shape to accommodate a particular product of a given size and shape.

Figure 3:
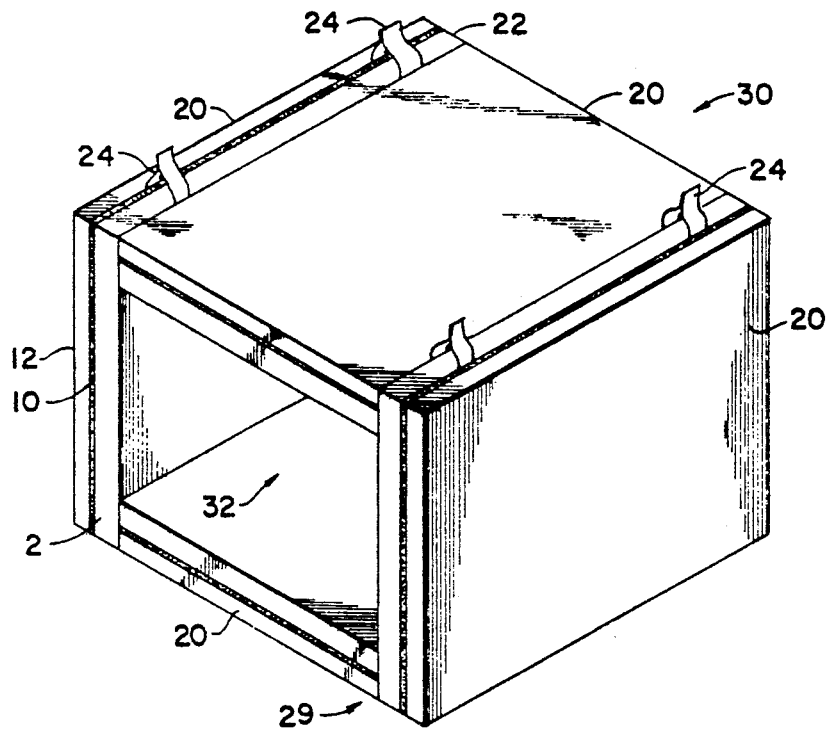
FIG. 3 is a perspective view of a search coil frame assembly provided in accordance with the invention.

The entrapped conductive material 4 must be electrically connected together on three sides of the frame, as illustrated in FIG. 3. To this end, thin metallic foil strips 24 are provided, one end 26 thereof being placed in contact with the conductive shield material 4 and the other end 28 protruding from the frame member 20 (FIGS. 1 and 2) and connected to another similar strip (FIG. 3). The omission of such connection on the fourth corner 29 provides the electrical equivalent of the gap previously described in the above discussion of prior art.

Figure 4:
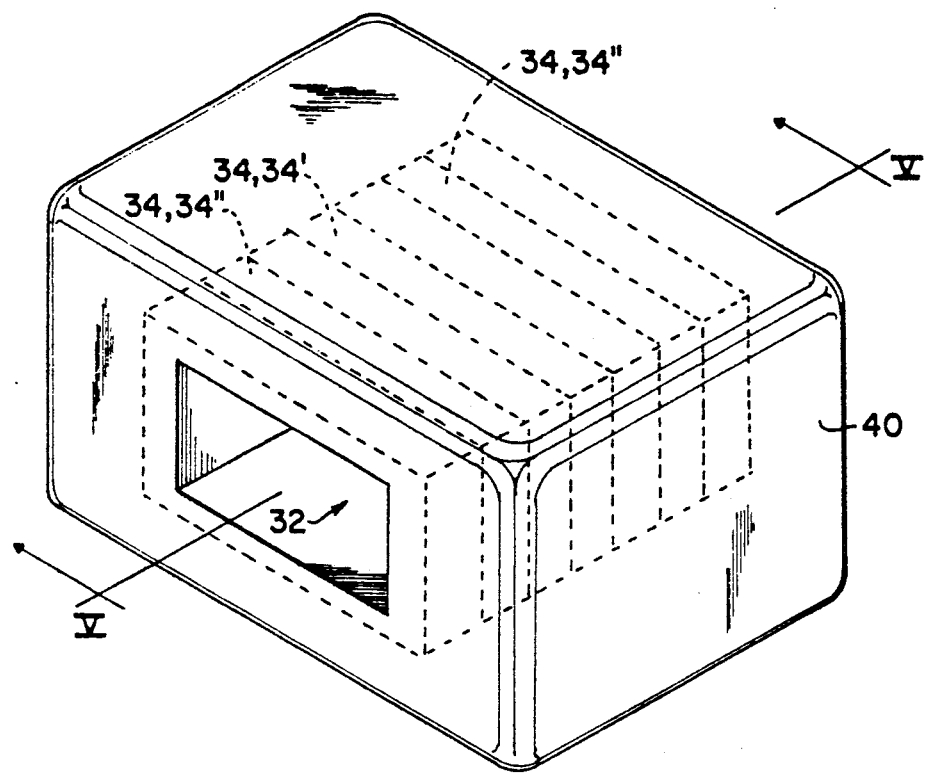
FIG. 4 is a perspective view of a search coil assembly provided in accordance with the invention.
Figure 5:
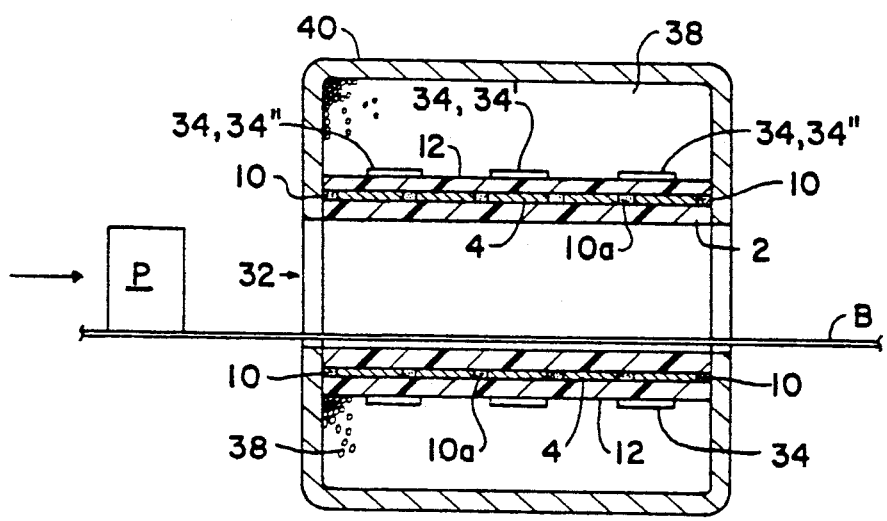
FIG. 5 is a sectional view, taken along line V—V of FIG. 4, and showing a conveyor belt and product thereon to be passed through the detector.

On the search coil frame assembly 30, there are wound electrically conductive strands 34, which may be conductive tapes, as shown in FIGS. 4 and 5, or may be wires. Typically, the strands 34 are arranged as shown in FIGS. 4 and 5, with the conductive strands 34 arranged with a "transmit" strand 34' disposed centrally of the frame, and on either side thereof a "receive" strand 34". Each of the strands 34', 34", has two free ends (not shown) which lead away from the assembly.

In operation of the search coil assembly, it is imperative that there be no relative movement between the conductive strands 34 and the frame assembly 30. To insure that such movement does not occur, the strands 34 are embedded in a potting plastic 38, applied in liquid form to completely cover the conductive strands. It is also important that no moisture reach the strands 34. The embedding of the strands 34 in the potting plastic 38 serves to keep the conductive strands free from moisture.

Finally, the potting plastic 38 is covered by a metal housing 40, which may be a rigid shell made of metal plates, or may be applied in molten form to the potting plastic to enclose the potting plastic in metal.

Upon completion of the above series of steps, there is provided a metal detector search coil assembly, as shown in FIGS. 4 and 5. The search coil assembly is then connected to the remainder of a metal detector apparatus, including a conveyor belt B (FIG. 5) extending through the aperture 32 to convey package F through the aperture for inspection for metal particles, in accordance with known procedures, and the conductive strand free ends connected to electronic circuitry disposed either in the assembly (not shown) or external to the search coil assembly.

By forming the frame 30 from the laminate frame members 20, the aperture interior walls may be of tough, rigid, wear-resistant and temperature-resistant plastic, and the conductive coating 4 may be positioned well removed from both the electrical coils and the aperture 32.

It is to be understood that the present invention is by no means limited to the particular construction herein disclosed and/or shown in the drawings, but also comprises any modifications or equivalents within the scope of the disclosure.

Having thus described my invention, what I claim as new and desired to secure by Letters Patent of the United States is:

1. A metal detector search coil assembly comprising a frame assembly having an aperture therethrough, electrically conductive strands wound upon said frame assembly, potting plastic disposed on external surfaces of said frame assembly and embedding said strands, and a metal housing enclosing said potting plastic, said frame assembly comprising four frame members joined together to form said aperture, each of said frame members comprising a first sheet of rigid plastic, a second sheet of rigid plastic of substantially the same configuration and substantially the same size as said first sheet, an electrically conductive material disposed between said first and second rigid plastic sheets, said conductive material being spaced from peripheral edges of said sheets, and adhesive disposed on margins of said sheets between said peripheral edges and said conductive material and including pockets of adhesive surrounded by said conductive material, to bond said sheets together with said conductive material bonded therebetween, and means for interconnecting each of said frame members conductive material with at least one other frame member conductive material, said interconnecting means comprising metallic foil strips and being operative at three corners of said frame assembly for interconnecting said conductive materials of two adjoining frame members, two metallic foil strips on one frame member being joined to two metallic foil strips on each of said adjoining frame members.

* * * * *